(12) United States Patent
Kang et al.

(10) Patent No.: US 7,023,472 B1
(45) Date of Patent: Apr. 4, 2006

(54) CAMERA CALIBRATION USING OFF-AXIS ILLUMINATION AND VIGNETTING EFFECTS

(75) Inventors: Sing Bing Kang, Arlington, MA (US); Richard S. Weiss, Montague, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/298,372

(22) Filed: Apr. 23, 1999

(51) Int. Cl.
- *H04N 17/001* (2006.01)
- *H04N 17/02* (2006.01)
- *H04N 9/64* (2006.01)

(52) U.S. Cl. .............. 348/187; 348/175; 348/176; 348/180; 348/188; 348/223.1; 348/251

(58) Field of Classification Search ........ 348/175–176, 348/180, 187–188, 251, 223.1; 358/461, 358/504; H04N 17/00, 17/02, 9/64
See application file for complete search history.

(56) References Cited

U.S. PATENT DOCUMENTS

| | | | | |
|---|---|---|---|---|
| 4,435,727 A | * | 3/1984 | Schiller | 348/187 |
| 4,544,952 A | * | 10/1985 | Van Chang | 348/188 |
| 4,887,123 A | * | 12/1989 | Wally et al. | 355/70 |
| 4,962,425 A | * | 10/1990 | Rea | 348/187 |
| 5,084,772 A | * | 1/1992 | Shimoyama | 358/461 |
| 5,136,388 A | * | 8/1992 | Sano et al. | 348/187 |
| 5,181,098 A | * | 1/1993 | Guerin et al. | 348/187 |
| 5,193,124 A | * | 3/1993 | Subbarao | 382/41 |
| 5,231,472 A | * | 7/1993 | Marcus et al. | 356/402 |
| 5,241,372 A | * | 8/1993 | Ohba | 358/22 |
| 5,351,201 A | * | 9/1994 | Harshbarger, Jr. et al. | 348/187 |
| 5,434,902 A | * | 7/1995 | Bruijns | 378/98 |
| 5,444,481 A | * | 8/1995 | Oshima | 348/187 |
| 5,467,128 A | * | 11/1995 | Yates et al. | 348/187 |
| 5,675,380 A | * | 10/1997 | Florent et al. | 348/251 |
| 5,699,440 A | * | 12/1997 | Carmeli | 348/180 |
| 5,757,425 A | * | 5/1998 | Barton et al. | 348/241 |
| 5,821,993 A | * | 10/1998 | Robinson | 348/187 |
| 5,909,027 A | * | 6/1999 | Ohura et al. | 250/280.1 |
| 6,016,161 A | * | 1/2000 | Robinson | 348/187 |
| 6,028,606 A | * | 2/2000 | Kolb et al. | 345/419 |
| 6,044,181 A | * | 3/2000 | Szeliski et al. | 382/284 |
| 6,052,124 A | * | 4/2000 | Stein et al. | 345/419 |
| 6,122,013 A | * | 9/2000 | Tamir et al. | 348/587 |
| 6,597,816 B1 | * | 7/2003 | Altunbasak et al. | 382/275 |

OTHER PUBLICATIONS

Tsai, Roger Y., "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-347.

(Continued)

*Primary Examiner*—Brian P Yenke
(74) *Attorney, Agent, or Firm*—Richard P. Lange

(57) ABSTRACT

An imaging device is calibrated using a flat, featureless surface and uniform illumination, relying on the effect of off-axis illumination and vignetting on the reduction of light into the camera at off-axis angles. The effect of the tilt of the camera is also considered. These effects are used to extract intrinsic camera parameters including focal length, principal point, aspect ratio and skew.

40 Claims, 7 Drawing Sheets

OTHER PUBLICATIONS

Stein, G.P., "Accurate Internal Camera Calibration using Rotation, with Analysis of Sources of Error," International Conference on Computer Vision, Cambridge, MA, Jun. 1995, pp. 230-236.

Movrovlis, P., et al., Geometrical Optics and Optical Design, Oxford University Press, 1997, pp. 130-131, 284.

* cited by examiner

CAMERA CALIBRATION USING OFF-AXIS ILLUMINATION AND VIGNETTING EFFECTS

BACKGROUND OF THE INVENTION

One of the most common activities prior to using an imaging device, such as a camera, is calibration. Many applications require reasonable estimates of camera parameters, especially those that involve structure and motion recovery.

There is a plethora of prior work on camera calibration. They can be roughly classified as weak, semi-strong and strong calibration techniques.

Strong calibration techniques recover all the camera parameters necessary for correct Euclidean (or scaled Euclidean) structure recovery from images. Many of such techniques require a specific calibration pattern with known exact dimensions. Photogrammetry methods which rely on the use of known calibration points or structures are described by D. C. Brown, "Close-range camera calibration", Photogrammetric Engineering, 37(8):855–866, August 1971 and R. Y. Tsai, "A versatile camera calibration technique for high-accuracy 3D machine vision metrology using off-the-shelf TV cameras and lenses", IEEE Journal of Robotics and Automation, RA-3(4):323–344, August 1987. Brown, for example, uses plumb lines to recover distortion parameters. Tsai uses corners of regularly spaced boxes of known dimensions for full camera calibration.

G. Stein, "Accurate internal camera calibration using rotation, with analysis of sources of error", Fifth International Conference on Computer Vision (ICCV'95), pages 230–236, Cambridge, Mass., June 1995 uses point correspondences between multiple views of a camera that is rotated a full circle to extract intrinsic camera parameters very accurately. There is also proposed self-calibration techniques such as those described by R. I. Hartley "An algorithm for self calibration from several views", IEEE Computer Society Conference on Computer Vision and Pattern Recognition(CVPR'94), pages 908–912, Seattle, Wash., June 1994, IEEE Computer Society, M. Pollefeys et al., "Self calibration and metric reconstruction in spite varying and unknown internal camera parameters", International Conference on Computer Vision (ICCV'98), pages 90–95, Bombay, India, January 1998, IEEE Computer Society Press and A. Zisserman et al., "Metric Calibration of a stereo rig", IEEE Workshop on Representations of Visual Scenes, pages 93–100, Cambridge, Mass., June 1995.

Weak calibration techniques recover a subset of camera parameters that will enable only projective structure recovery through the fundamental matrix. Faugeras, "What can be seen in three dimensions with an uncalibrated stereo rig", Second European Conference on Computer Vision (ECCV'92), pages 563–578, Santa Margherita Ligure, Italy, May 1992, Springer-Verlag opened the door to this category of techniques. There are numerous other players in the field, such as Hartley, "In defense of the 8-point algorithm", Fifth International Conference on Computer Vision (ICCV'95), pages 1064–1070, Cambridge, Mass., June 1995, IEEE Computer Society Press and A. Shashua, "Projective structure from uncalibrated images: Structure from motion and recognition", IEEE transactions on Pattern Analysis and Machine Intelligence, 16(8):7788–790, August 1994.

Semi-strong calibration falls between strong and weak calibration; it allows structures that are close to Euclidean under certain conditions to be recovered. Affine calibration described in J. J. Koenderink et al. "Affine structure from motion", Journal of the Optical Society of America A, 8:377–385538, 1991 falls into this category. In addition, techniques that assume some subset of camera parameters to be known also fall into this category. They include the technique discussed in H. C. Longuet-Higgins, "A computer algorithm for reconstructing a scene from two projections", Nature, 293:133–135, 1991 and a technique described by Hartley et al., "Estimation of relative camera positions for uncalibrated cameras, Second European Conference on Computer Vision (ECCV'92) pages 579–587, Santa Margherita, Liguere, Italy, May 1992, Springer-Verlag for recovering camera focal lengths corresponding to two views with the assumption that all other intrinsic camera parameters are known.

The common thread of all these calibration methods is that they require some form of image feature, or registration between multiple images in order to extract camera parameters.

SUMMARY OF THE INVENTION

We present a camera calibration technique that requires only a flat, textureless surface, for example, a blank piece of paper, and uniform illumination. The camera optical and physical shortcomings are used to extract the camera parameters.

The image of the textureless surface having uniform illumination is digitized. The parameters of the imaging device are computed based on drop off effects due to the imaging device. The drop off effects may be dependent on an off-axis pixel projection effect and a vignetting effect. The parameters may also be computed based on a camera tilt effect. The parameters of a model are preferably computed by minimizing the difference between the digitized image and the model.

One advantage of the calibration technique is that no special patterns are required. The technique provides reasonable estimates of camera parameters and may be used for applications that may not need accurate camera parameters. For example the technique may be used to provide an estimate of the camera parameter for image based rendering applications.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
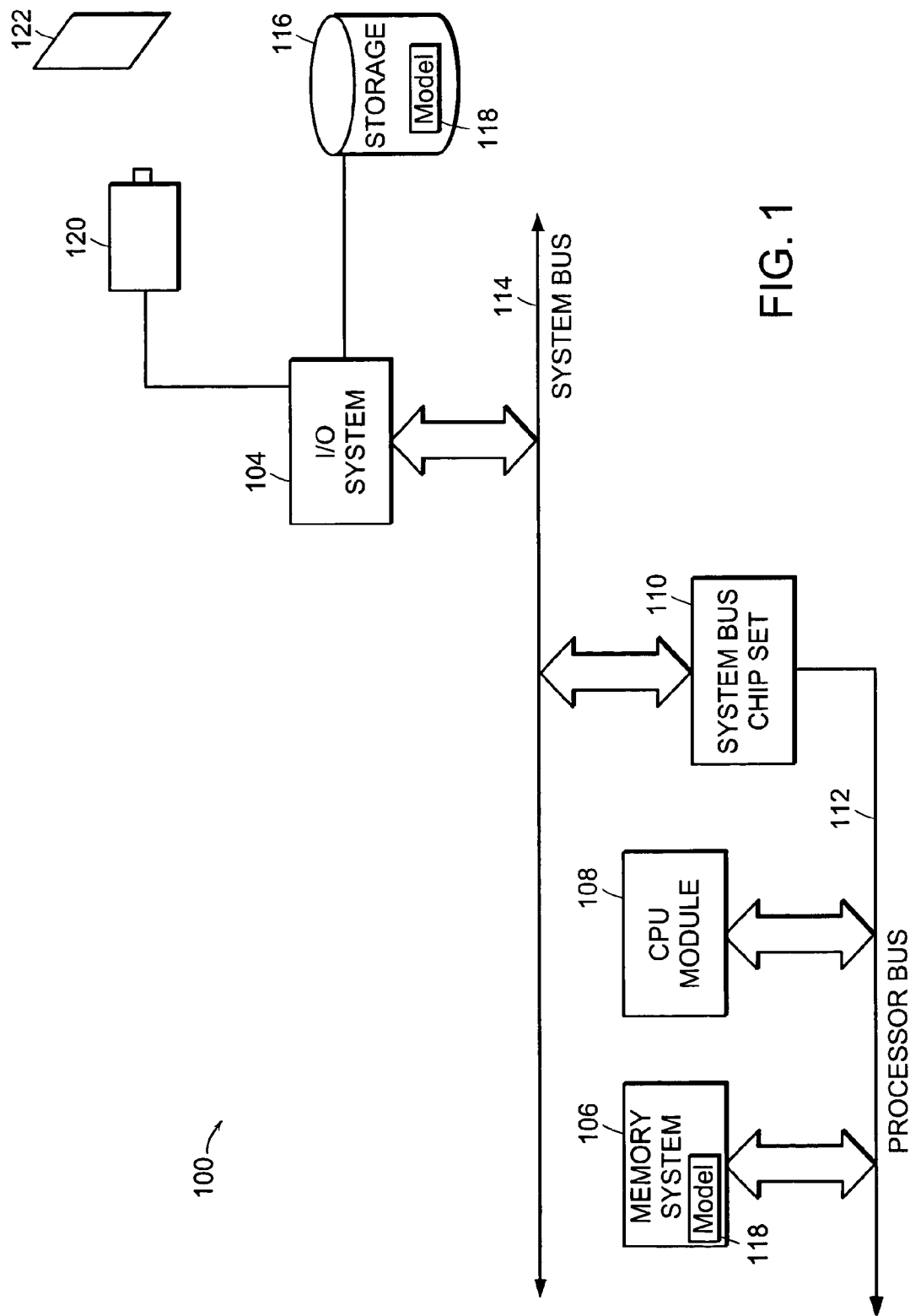
FIG. 1 is a block diagram of a computer system in which the present invention may be used.

FIG. 1 is a block diagram of a typical computer system 100 in which the present invention is utilized. Included in the computer system 100 are a Central Processing Unit ("CPU") module 108, a memory system 106 and a system bus chip set 110 connected by a processor bus 112. The system bus chip set 110 is further connected to an Input/Output ("I/O") system 104 by a system bus 114. An external storage device 116 is connected to the I/O system 104. A calibration model 118 is stored in the storage device 116 and also stored in memory 106. A camera 120 is connected to the I/O system 104. The camera 120 digitizes an image of the textureless surface 122.

Figure 2:
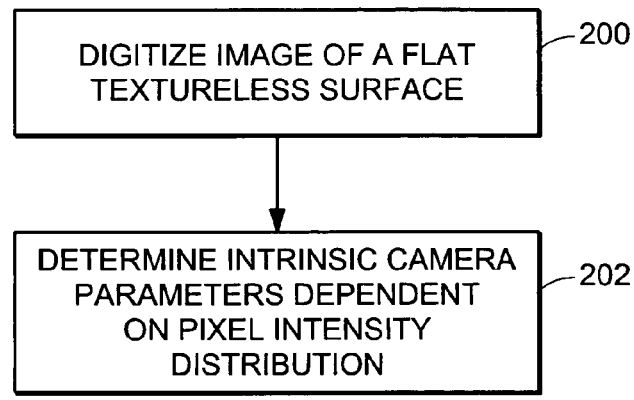
FIG. 2 is a flowchart showing the steps for calibrating an imaging device according to the principles of the present invention.

FIG. 2 illustrates the steps for calibrating an imaging device, for example a camera, according to the principles of the current invention. In step 200 an image of a flat, textureless surface with uniform illumination is digitized. The surface may be any flat, textureless surface such as, a blank sheet of white paper or a white board.

In step 202 the change of pixel intensity in the digitized image is used to determine the intrinsic parameters of the imaging device. The intrinsic parameters determined include the focal length, aspect ratio, principal point and skew. The downhill Nelder-Mead algorithm may be implemented to recover the intrinsic parameters, or any other similar algorithm may be used.

Figure 3:
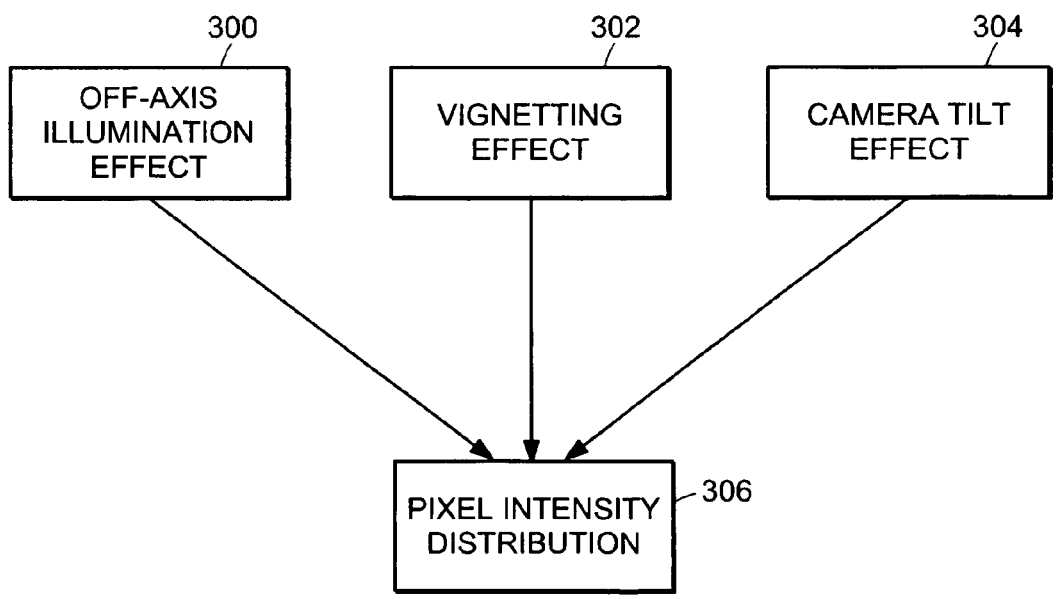
FIG. 3 is a diagram showing the factors influencing the pixel intensity distribution used to calibrate the imaging device.

FIG. 3 shows the known factors that result in a change of pixel density distribution 306 in the digitized image. They include off-axis illumination 300, vignetting 302 and camera tilt 304. The off-axis illumination effect 300 is described in conjunction with FIGS. 4A–D. The camera tilt effect 304 is described in conjunction with FIGS. 5A–C. The vignetting effect 302 is described in conjunction with FIGS. 6A–B.

Off-Axis Illumination

Figure 4A:
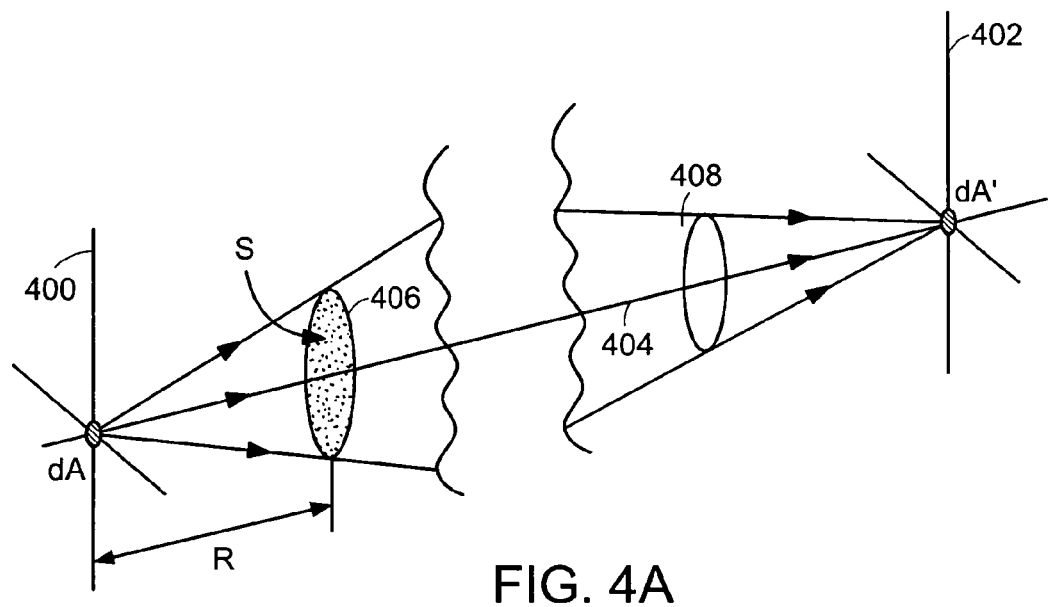
FIG. 4A is an illustration of on-axis illumination.
Figure 4B:
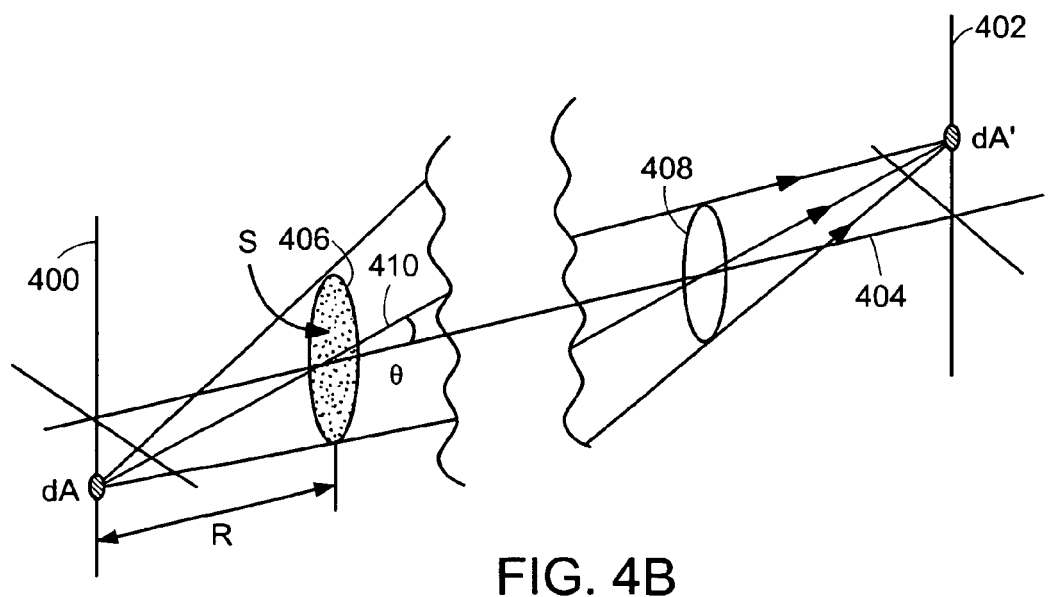
FIG. 4B is an illustration of the off-axis illumination effect.

FIGS. 4A–B is a perspective view of a source object 400, an image plane 402, a first lens or entrance pupil 406 and a second lens or exit pupil 408. The source object 400 has a flat, textureless surface. The entrance pupil 406 represents the limiting window, or aperture, through which all light rays from the source object 400 must pass. The exit pupil 408 represents the limiting aperture through which all light rays to the image plane 402 must pass. It is assumed that the entrance pupil 406 and the exit pupil 408 are circular. Optics between the two pupils are not shown.

It is also assumed that the surface properties of the flat textureless source object 400 are constant throughout and can be approximated as a Lambertian source. A Lambertian source is a source for which luminance is independent of direction. It is also assumed that illumination is constant throughout the surface of the source object 400, that is, there are no shadows on the flat, textureless surface of the source object 400. The source object 400 is perpendicular to the optical axis 404, and the center of the source object 400 is on the optical axis 404.

In FIG. 4A a source element dA is shown at the center of the source object 400, on the optical axis 404. Light rays from source element dA travel on-axis along the optical axis 404 to image element dA' in the image plane 402. As light rays travel from the source element dA to the image element dA' they are attenuated. The behavior of attenuation is optical in nature. The attenuation of the light ray reduces the illumination of the image element dA' in the image plane 402. The amount of attenuation of a ray is dependent on the distance traveled by the light ray and on the angle between the light ray and the optical path 404.

In FIG. 4B a source element dA is shown a distance away from the center of the source object 400 below the optical axis 404. Light rays from the source element dA travel off-axis along an off-axis path 408 at a field angle from the optical axis 404.

The illumination of the image element dA' in the image plane 402 varies across the field of view in proportion to the fourth power of the cosine of the angle θ between the light ray and the optical path 404. Thus, the on-axis light ray traveling along the optical axis 404 shown in FIG. 4A from source element dA to image element dA' with an angle equal to 0° has the least amount of attenuation.

The illumination of the image element dA in FIGS. 4A and 4B is shown to be in proportion to the fourth power of the cosine of the field angle θ as discussed in P. Mavrolis and J. McDonald, "Geometric Optics and Optical Design", Oxford University Press, 1997, pp. 130–131 as follows:

The illuminance on-axis ($I'_o$) at the image point dA' is:

$$I'_0 = \frac{LS}{(MR)^2} \tag{1}$$

where L: The radiance of the source at dA, the emitted flux per unit solid angle, per unit projected area of the source.

S: The area of the pupil normal to the optical axis.

M: The magnification.

R: The distance of dA to the entrance pupil.

The flux is related to the illuminance by the equation $$I' = \frac{d\Phi}{dA'} \tag{2}$$

Combining equations (1) and (2) and substituting for the size of the image point $dA'=M^2 dA$ results in equation (3) flux for the on-axis image point dA, where dA is an infinitely small area in the source.

$$d\Phi_0 = \frac{Ld AS}{R^2} \tag{3}$$

The flux for the off-axis image point dA is:

$$d\Phi = \frac{L(dA\cos\theta)(S\cos\theta)}{(R/\cos\theta)^2} \quad (4)$$
$$= dA\frac{LS}{R^2}\cos^4\theta$$
$$= dA'\frac{LS}{(MR)^2}\cos^4\theta$$

substituting for (1) and (2) in (4) the illuminance of the off-axis image point is:

$$I'(\theta) = I'_0 \cos^4\theta \quad (5)$$

Figure 4C:
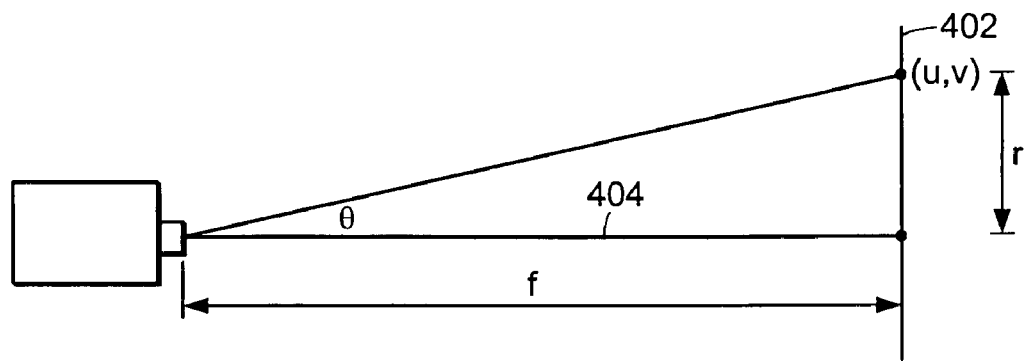
FIG. 4C is an illustration of the off-axis effect showing the correspondence between focal length, off-axis angle and entrance angle for the off-axis illumination effect shown in FIG. 3.

FIG. 4C shows the relationship between the focal length f and an image point u, v a distance r from the principal point on the optical axis 404. Using Pythagoras's Theorem and the Cosine Rule for right angled triangle, a substitution for $\cos^4\theta$ in equation (5) dependent on focal length f is made in equation (6) below.

$$I'(\theta) = I'_0 \left( \frac{f}{\sqrt{f^2 + u^2 + v^2}} \right) \quad (6)$$

Figure 4D:
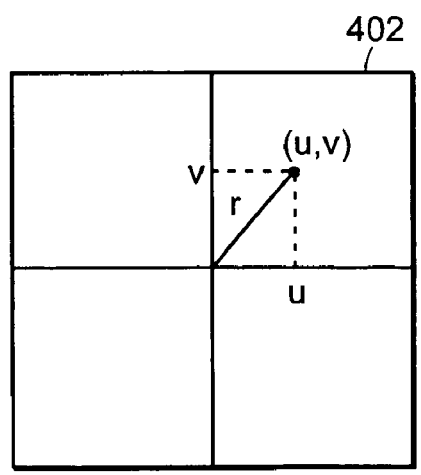
FIG. 4D is an illustration of the off-axis effect showing the correspondence between the pixel location on the virtual image plane and the distance from the principal point.

FIG. 4D shows the relationship between the co-ordinates u and v of the image point on the virtual image plane 402 and the distance r from the principal point. Using Pythagoras's Theorem it is seen that $r^2 = u^2 + v^2$. Equation (7) below is the resulting equation after substituting for u and v in equation (6) and performing operations to reduce the equation.

$$I'(\theta) = I'_0 \frac{1}{(1 + (r/f)^2)^2} = \beta I'_0 \quad (7)$$

Therefore, the attenuation in illumination of the image point dA' from the object element dA is in proportion to the distance from the center of the image on the optical axis 404 and the focal length f. The off-axis attenuation factor is represented by β in Equation (7).

Camera Tilt Effect

The off-axis illumination effect described in conjunction with FIGS. 4A–4D assumed that the object surface is perpendicular to the optical path 404. The off-axis illumination effect described may be extended to include the camera tilt effect.

Figure 5A:
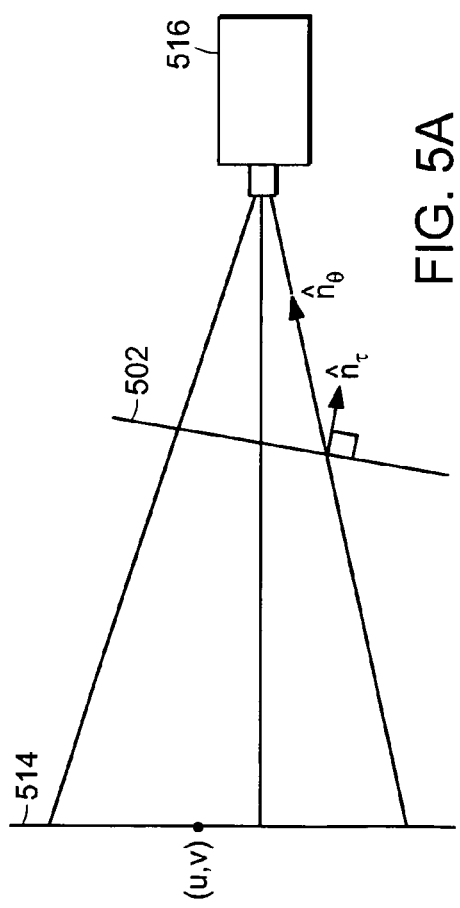
FIG. 5A is an illustration an object surface tilted at an angle from the virtual image plane.
Figure 5C:
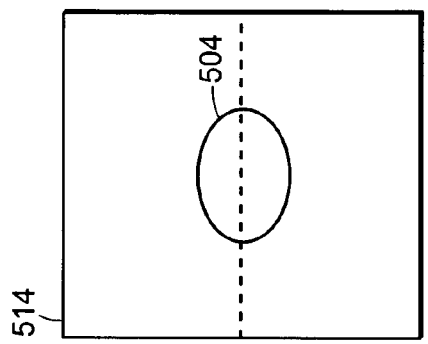
FIG. 5C shows the foreshortening effect on an image with the object surface tilted as shown in FIG. 5A.
Figure 5B:
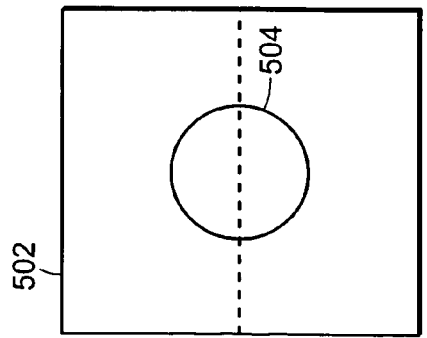
FIG. 5B shows a circle of uniform illumination on the surface of the source object'
Figure 5D:
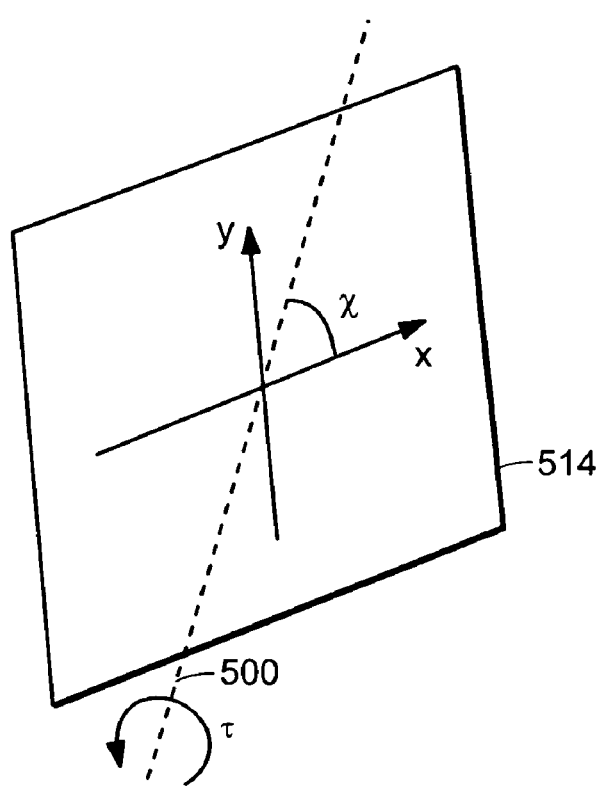
FIG. 5D shows the camera rotation axis of the source object shown in FIG. 5A.
Figure 5E:
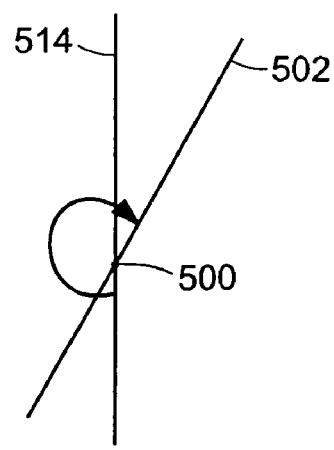
FIG. 5E shows the tilt of the source object with respect to the image plane.

The camera tilt effect is described in conjunction with FIGS. 5A–E. FIG. 5A shows a source object 514, a virtual image plane 502 and an imaging device 516 such as a camera. FIG. 5B shows a circular area of uniform intensity 504 on the surface of the source object 514. FIG. 5C shows the foreshortening effect due to camera tilt on the circular area of uniform intensity 504 at the image plane 514. FIG. 5D shows the source object 514 and the camera rotation around a camera rotation axis 500, the broken line in the plane of the object 502, at a camera tilt angle τ. FIG. 5E shows the perpendicular image plane 514 and the object 502 tilted at an angle from the image plane 514 looking down the axis 500.

In FIG. 5A the virtual image plane 514 is shown perpendicular to the camera 516. The source object 502 is shown at an angle to the virtual image plane 514. An image point (u, v) is located in the virtual image plane 514. FIG. 5D shows the camera rotation axis 500 located at an angle χ relative to the x-axis of the source object 502. Two angles are used to indicate the rotation (tilt) of the source object 502. They are the angle χ relative to the x-axis and angle τ representing the amount of rotation around the camera rotation axis 500. Using the camera tilt angle and the image plane rotation angle the normal to the tilted object, the surface normal, is:

$$\hat{n}_\tau = (\sin\chi \sin\tau, -\cos\chi \sin\tau, \cos\tau)^T. \quad (8)$$

The light ray that passes through the image point (u,v) on the virtual image 514 has a unit vector, that is, the inter-pixel spacing is equal to one. The vector for the ray direction for the point (u,v) is:

$$\hat{n}_\theta = \frac{\left(\frac{u}{f}, \frac{v}{f}, 1\right)^T}{\sqrt{1 + \left(\frac{r}{f}\right)^2}} = \cos\theta\left(\frac{u}{f}, \frac{v}{f}, 1\right)^T. \quad (9)$$

Combining equation (8) and (9) the foreshortening effect due to the camera tilt is thus $$\hat{n}_\theta \cdot \hat{n}_\tau = \cos\theta\cos\tau\left(1 + \frac{\tan\tau}{f}(u\sin\chi - v\cos\chi)\right) \quad (10)$$

The off-axis illumination effect described in conjunction with FIGS. 4A–C is combined with the foreshortening effect due to camera tilt in Equation (10). To take into consideration the foreshortening effect on the off-axis image point dA shown in FIG. 3, dACos θ in Equation 4 is replaced by $dA(\hat{n}_\theta \cdot \hat{n}_\tau)$. Also the distance to the lens $(R/\cos\theta)^2$ in Equation 4 is replaced by $(R/(\hat{n}_\theta \cdot \hat{n}_\tau/\cos\tau))^2$. This is computed based on the following reasoning: The equation of the tilted image plane, originally R distance away from the center of projection, is:

$$p \cdot \hat{n}_\tau = (0, 0, R)^T \cdot \hat{n}_\tau = R\cos\tau \quad (11)$$

The image point (u, v), whose unit vector in space is $n_\theta$ is the projection of the point $R_\tau n_\theta$, where $R_\tau$ is the distance of the 3-D point to the point of projection. Substituting into equation (11), results in:

$$R_\tau = \frac{R\cos\tau}{\hat{n}_\theta \cdot \hat{n}_\tau} \quad (12)$$

Incorporating these changes into Equation 5 for the off-axis illumination effect results in the following equation for the distribution of intensity taking into consideration the camera tilt effect and the off-axis illumination effect.

$$I'(\theta) = I'_0(\hat{n}_\theta \cdot \hat{n}_\tau) \left( \frac{\hat{n}_\theta \cdot \hat{n}_\tau}{\cos\tau} \right)^2 \cos\theta \qquad (13)$$

$$= I'_0 \cos\tau \left( 1 + \frac{\tan\tau}{f}(u\sin\chi - v\cos\chi) \right)^3 \cos^4\theta$$

$$= I'_0 \gamma \cos^4\theta = I'_0 \gamma\beta$$

Vignetting Effect

In an ideal system the entire field of light rays from the source object is transmitted through an imaging device to the image. This requires that the lens stop cover the entire field of light rays from the source object. In a non-ideal system a vignetting effect occurs in the image because some of the light rays from the source object are obstructed by the lens stops. The vignetting effect on the image is observed as a reduction in illumination of image points at the edge of the image caused by the geometric effect of the lens stop. The vignetting effect in an imaging device is described in conjunction with FIGS. 6A and 6B.

Figure 6A:
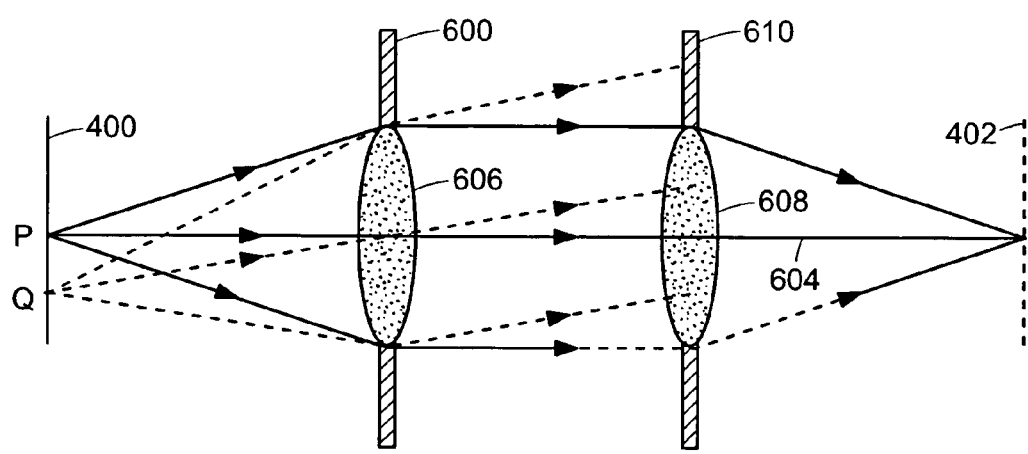
FIG. 6A is an illustration of the vignetting effect.

FIG. 6A shows a source object 400, a sensor plane 402, a first lens 606, a first lens stop 600, a second lens 608 and a second lens stop 610. Cones of light rays from points P and Q on the source object 400 in object space pass through the first lens 606.

As shown, all the light rays from point P on the source object 400 pass through the first lens 606 and the second lens 608. However, the upper light rays from point Q on the source object 300 are cut off, or vignetted, by the lens stop 610 adjacent to the second lens 608.

Figure 6B:
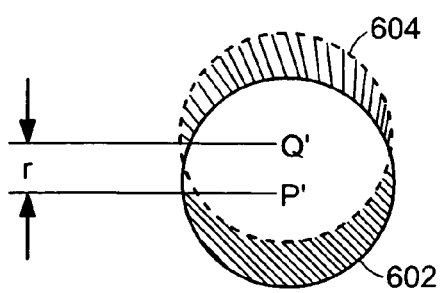
FIG. 6B is a further illustration of the vignetting effect.

FIG. 6B is used to calculate the vignetting effect due to light rays from point Q being obstructed by the lens stop 610 as seen by the second lens 608. The image point P' is shown at the center of the first circle 602. The image point Q' is shown at the center of the second circle (dashed lines) 604. The second circle 604 shows the geometrical projection of the lens stop 600 by rays from Q on the source object 400, in respect to the second lens stop 610. The area of the shaded areas lost because of the vignetting effect are used to calculate the vignetting effect as described in Strong, "Concepts of Classical Optics", pg 248, W.H. Freeman and Co., San Franciso, Calif., 1958. The vignetting effect can be expressed as the approximation.

$$I'_{vig}(\theta) \approx (1-\alpha r)I'(\theta) \qquad (14)$$

where: r is the distance between P' and Q'
α is the vignetting factor to be determined.

It is assumed that the vignetting effect is small compared to the off-axis illumination effect discussed in conjunction with FIGS. 4A–D. The vignetting effect is geometric in nature and the off-axis illumination effect is optical in nature. The pixel intensity drop off effect in the image 402 is dependent on the vignetting effect and the off-axis illumination effect.

Combined Effect

Combining all three effects, camera tilt, off-axis illumination and vignetting is achieved by combining Equations 13 and 14. This results in the following equation, the calibration model 118 (FIG. 1):

$$I'_{all}(\theta) = I'_0(1-\alpha r)\gamma\beta \qquad (15)$$

where α=vignetting effect.
γ=camera tilt effect.
β=off-axis illumination effect.

The other camera intrinsic parameters may be computed using the following equation:

$$\begin{pmatrix} u \\ v \end{pmatrix} = \begin{pmatrix} 1 & s \\ 0 & a \end{pmatrix} \begin{pmatrix} u_{orig} \\ v_{orig} \end{pmatrix} - \begin{pmatrix} p_x \\ p_y \end{pmatrix} \qquad (16)$$

where:
($p_x$, $p_y$) is the principal point
a is the aspect ratio
s is the skew
($u_{orig}$, $v_{orig}$) is the original image location relative to the camera image center The objective function that is to be minimized is thus:

$$\varepsilon = \sum_{ij} (I'_{all,ij}(\theta) - I'_0(1-\alpha r)\gamma\beta)^2 \qquad (17)$$

The minimization in Equation 17 minimizes the error between the digitized image stored in memory 106 (FIG. 1) and the calibration model 118 (FIG. 1) stored in the storage device 116 (FIG. 1) and memory 106 (FIG. 1). The downhill Nelder-Mead algorithm may be implemented to recover the intrinsic parameters or any other similar algorithm may be used.

The calibration technique may not be as accurate as other calibration techniques but one advantage is that no special patterns are required. The technique provides reasonable estimates of camera parameters and may be used for applications that may not need accurate camera parameters. For example the technique may be used to provide an estimate of the camera parameters for image based rendering applications. Image-based rendering techniques use 2-D images for visualizing in 3-D as well as editing and manipulating 3-D objects. A set of 2-D images of the object taken from different viewpoints is used to provide the 3-D geometric information such as depth information to render novel views of the 3-D objects.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for calibrating a camera comprising the steps of:
digitizing an image of a blank textureless surface having a uniform illumination;
from the digitized image, determining a pixel intensity drop off caused by a combination of a vignetting effect and an off-axis pixel projection effect due to camera defects;

from the determined pixel intensity drop off, approximating the vignetting effect and the off-axis pixel projection effect using a modeling equation; and recovering an intrinsic parameter of the camera other than pixel intensity drop off using substantially only the determined pixel intensity drop off.

2. The method as claimed in claim 1 wherein the step of determining is dependent on a camera tilt effect.

3. The method as claimed in claim 1 further comprising the step of computing the parameters of a model by minimizing the difference between the digitized image and the model.

4. The method as claimed in claim 1 wherein the intrinsic parameter is selected from the group consisting of focal length, principal point, skew and aspect ratio.

5. The method as claimed in claim 1 wherein the intrinsic parameter is focal length.

6. The method as claimed in claim 1 wherein the intrinsic parameter is principal point.

7. The method as claimed in claim 1 wherein the intrinsic parameter is skew.

8. The method as claimed in claim 1 wherein the intrinsic parameter is aspect ratio.

9. A computer program product for calibrating a camera, the computer program product comprising a computer usable medium having computer readable code thereon, including program code which:

retrieves a digitized image of a blank textureless surface having a uniform illumination;

from the digitized image, determines a pixel intensity drop off caused by a combination of a vignetting effect and an off-axis pixel projection effect;

from the determined pixel intensity drop off approximating the vignetting effect and the off-axis pixel projection effect using a modeling equation; and recovers an intrinsic parameter of the camera other than pixel intensity drop off based on substantially only the determined drop off.

10. The computer program product as claimed in claim 9 wherein the program code computes parameters based on a camera tilt effect.

11. The computer program product as claimed in claim 9 wherein the program code computes parameters of a model by minimizing difference between the digitized image and the model.

12. The computer program product as claimed in claim 9 wherein the intrinsic parameter is selected from the group consisting of focal length, principal point, skew and aspect ratio.

13. The computer program product as claimed in claim 9 wherein the intrinsic parameter is focal length.

14. The computer program product as claimed in claim 9 wherein the intrinsic parameter is principal point.

15. The computer program product as claimed in claim 9 wherein the intrinsic parameter is skew.

16. The computer program product as claimed in claim 9 wherein the intrinsic parameter is aspect ratio.

17. A computer system comprising:

a memory system;

an I/O system connected to the memory system;

a storage device connected to the I/O system; and a calibration routine located in the memory system responsive to a request for calibrating a camera which:

retrieves a digitized image of a blank textureless surface having a uniform illumination;

from the digitized image, determines a pixel intensity drop off caused by a combination of a vignetting effect and an off-axis pixel projection effect;

from the determined pixel intensity drop off, approximating the vignetting effect and the off-axis pixel projection effect using a modeling equation; and recovers an intrinsic parameter of the camera other than pixel intensity drop off based on substantially only the determined drop off.

18. The computer system as claimed in claim 17 wherein the calibration routine determines parameters dependent on a camera tilt effect.

19. The computer system as claimed in claim 17 wherein the calibration routine computes parameters of a model stored in the storage device, by minimizing difference between the digitized image and the model.

20. The computer system as claimed in claim 17 wherein the intrinsic parameter is selected from the group consisting of focal length, principal point, skew and aspect ratio.

21. The computer system as claimed in claim 17 wherein the intrinsic parameter is focal length.

22. The computer system as claimed in claim 17 wherein the intrinsic parameter is principal point.

23. The computer system as claimed in claim 17 wherein the intrinsic parameter is skew.

24. The computer system as claimed in claim 17 wherein the intrinsic parameter is aspect ratio.

25. An apparatus for calibrating a camera comprising:

means for digitizing an image of a blank textureless surface having a uniform illumination;

means for determining a pixel intensity drop off in the digitized image caused by a combination of a vignetting effect and an off-axis pixel projection effect;

means for approximating the vignetting effect and the off-axis pixel projection effect in the digitized image using a modeling equation; and means for recovering an intrinsic parameter of the camera other than pixel intensity drop off using substantially only the determined pixel intensity drop off.

26. The apparatus as claimed in claim 25 wherein the means for computing computes parameters based on a camera tilt effect.

27. The apparatus as claimed in claim 25 wherein the means for computing further comprises means for computing parameters of a model by minimizing difference between the digitized image and the model.

28. The apparatus as claimed in claim 25 wherein the intrinsic parameter is selected from the group consisting of focal length, principal point, skew and aspect ratio.

29. The apparatus as claimed in claim 25 wherein the intrinsic parameter is focal length.

30. The apparatus as claimed in claim 25 wherein the intrinsic parameter is principal point.

31. The apparatus as claimed in claim 25 wherein the intrinsic parameter is skew.

32. The apparatus as claimed in claim 25 wherein the intrinsic parameter is aspect ratio.

33. An apparatus for calibrating a camera comprising:

a retrieval routine which retrieves a digitized image of a blank textureless surface having a uniform illumination;

a routine which determines a pixel intensity drop off in the digitized image caused by a combination of a vignetting effect and an off-axis pixel projection effect;

an approximating routine which approximates the vignetting effect and the off-axis pixel projection effect in a digitized image using a modeling equation; and a parameter computing routine which recovers an intrinsic parameter of the camera other than the pixel intensity drop off using substantially only the determined pixel intensity drop off.

34. The apparatus as claimed in claim 33 wherein the parameter computing routine further comprises a model routine which computes parameters of a model by minimizing difference between the digitized image and the model.

35. A method for calibrating a camera comprising the steps of:
digitizing an image of a blank textureless surface having a uniform illumination;
from the digitized image, determining a pixel intensity drop off caused by a combination of a vignetting effect and an off-axis pixel projection effect;
from the determined pixel intensity drop off, approximating the vignetting effect and the off-axis pixel projection effect using a modeling equation; and
recovering focal length of the camera using substantially only the determined pixel intensity drop off.

36. The method of claim 35 wherein the off-axis pixel projection effect is dependent on the focal length of the camera.

37. The method of claim 36 wherein illuminance of an off-axis image point in the digitized image is proportional to the focal length and distance of the point from the center of the digitized image on the optical axis.

38. A method for calibrating a camera comprising the steps of:
digitizing an image of a blank textureless surface having a uniform illumination;
from the digitized image, determining pixel intensity drop off caused by a combination of a reduction in illumination of image points at the edge of the digitized image and a variation in illumination across the field of view in proportion to the fourth power of the cosine of an angle between a light ray and an optical path;
from the determined pixel intensity drop off approximating the reduction in illumination of image points at the edge of the digitized image and the variation in illumination across the field of view in proportion to the fourth power of the cosine of an angle between a light ray and an optical path; and
recovering an intrinsic parameter of the camera other than pixel intensity drop off using substantially only the determined pixel intensity drop off.

39. A method for providing an estimate for a camera parameter comprising the steps of:
digitizing an image of a blank textureless surface having a uniform illumination;
from the digitized image, determining a pixel intensity drop off caused by a combination of a reduction in illumination of image points at the edge of the digitized image and a variation in illumination across the field of view in proportion to the fourth power of the cosine of an angle between a light ray and an optical path;
from the determined pixel intensity drop off, approximating the reduction in illumination of image points at the edge of the digitized image and the variation in illumination across the field of view in proportion to the fourth power of the cosine of an angle between a light ray and an optical path, and
recovering an intrinsic parameter of the camera other than pixel intensity drop off using substantially only the determined pixel intensity drop off.

40. The method of claim 39, wherein the intrinsic parameter is recovered for use by an image based rendering application.

* * * * *